3,210,177
HERBICIDAL METHOD
Paul E. Hoch, Youngstown, N.Y., assignor to Hooker Chemical Corporation, Niagara Falls, N.Y., a corporation of New York
No Drawing. Filed Oct. 29, 1962, Ser. No. 233,886
1 Claim. (Cl. 71—2.6)

This invention relates to a novel benzoyl chloride, novel derivatives thereof and to novel methods for preparing both such chloride and such derivatives. More particularly this invention relates to the new compounds 4,5,6,α,α,α-hexachloro-3-toluyl chloride, 2,3,4-trichloro-5-trichloromethylbenzoic acid, and to new derivatives of same such as the anilide of 4,5,6,α,α,α-hexachloro-3-toluic acid and to novel methods of preparation of these compounds as well as others.

This is a continuation-in-part of my earlier filed application S.N. 818,517, filed June 8, 1959, now abandoned.

Utility for some of these compounds is found in the examples which follow. In addition the compounds may be used in the preparation of polymers, which are, due to the high chlorine content, flame retardant in nature. The compounds of the present invention may also be used as flameproofing agents. They also may be used as chemical intermediates and as herbicidal agents.

It is a finding of this invention that hexachlorocyclopentadiene may be reacted with fumaryl chloride to yield 3,4,5,6,7,7 - hexachloro - 3-6-methano-1,2,3,6-tetrahydrophthaloyl chloride and that this compound when heated to a temperature of between about 180 degrees and 220 degrees centigrade or to 140 degrees centigrade with ferric chloride catalyst yields 4,5,6,α,α,α-hexachloro-3-toluyl chloride. The following equations illustrate the foregoing:

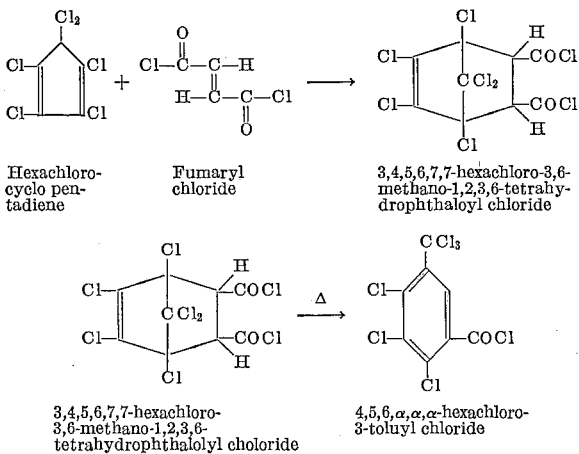

Hexachlorocyclopentadiene
Fumaryl chloride
3,4,5,6,7,7-hexachloro-3,6-methano-1,2,3,6-tetrahydrophthaloyl chloride 3,4,5,6,7,7-hexachloro-3,6-methano-1,2,3,6-tetrahydrophthalolyl choloride
4,5,6,α,α,α-hexachloro-3-toluyl chloride Another method for preparing 3,4,5,6,7,7-hexachloro-3,6-methano-1,2,3,6-tetrahydrophthaloyl chloride, the starting material of this invention, is from the treatment of 3,4,5,6,7,7-hexachloro-3,6-methano-1,2,3,6-tetrahydrophthalic anhydride (also known as chlorendic anhydride) with phosphorus pentachloride.

It is a further finding of this invention that organic esters of 4,5,6,α,α,α,-hexachloro-3-toluyl chloride may be prepared by refluxing said chloride with an organic alcohol until solution results.

The following equations typify this esterification reaction.

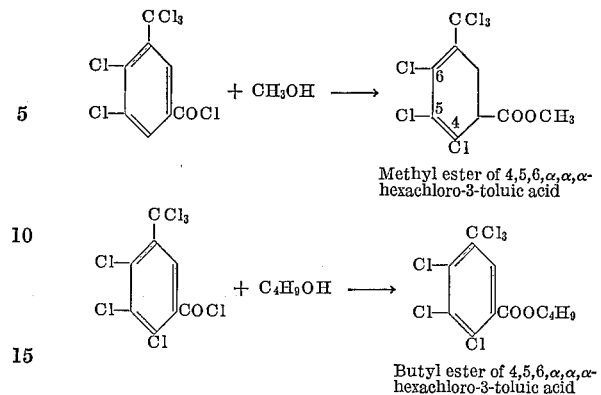

Methyl ester of 4,5,6,α,α,α-hexachloro-3-toluic acid

Butyl ester of 4,5,6,α,α,α-hexachloro-3-toluic acid

Various other reactions and preparations and products prepared thereby although not set forth in equation form, will be described hereinafter and also comprise a part of the present invention.

The following examples are set forth to further illustrate the teachings of this invention.

*Example 1.—The preparation of 4,5,6,α,α,α-hexachloro-3-toluyl chloride*

A three-necked, round-bottomed flask was charged with 429 grams of fumaryl chloride and 756 grams of hexachlorocyclopentadiene. The solution was warmed with stirring to 179 degrees to 185 degrees centigrade for in excess of forty-eight hours. The reaction mixture was subjected to a diminished pressure distillation. After removal of the unreacted hexachlorocyclopentadiene and fumaryl chloride, the trans acid chloride reaction product of these two materials began distilling at 175 to 185 degrees centigrade at 12–17 millimeters, and having a melting point of 49–50 degrees. *Analysis.*—Calc'd for $C_9H_2O_2Cl_8$: Cl, 66.6. Found: Cl, 66.8%. After about 500 grams of this trans acid chloride product or adduct was distilled, a solid began to appear and the last cut was all solid, having a boiling point of 195 degrees to 203 centigrade at 12 millimeters pressure. The solid was recrystallized from hexane and had a melting point of 105 degrees to 106 degrees centigrade (uncorrected). Chlorine anal. for $C_8HOCl_7$: Theory 68.8%. Found: 68.7%.

The adduction reaction between hexachlorocyclopentadiene and fumaryl chloride is preferably carried out at a temperature between about 140 and 200 degrees centigrade while the decomposition of this adduct is preferably carried out at a temperature between about 180 degrees and 220 degrees centigrade.

*Example 2.—Alternate preparation of 4,5,6,α,α,α-hexachloro-3-toluyl chloride*

A mixture of 42 grams of the trans acid chloride and 0.3 gram FeCl₃ were heated with stirring at 140–150 degrees centigrade, considerable gasing occurring. The mixture was heated one-half hour and then poured into 100 cc. hexane. The hexane solution was treated with decolorizing charcoal, filtered and cooled. A crystalline solid separated having a melting point of 105 degrees centigrade and identical in infra-red spectrum to the solid isolated in Example 1 above.

*Example 3.—Alternate preparation of 4,5,6,α,α,α-hexachloro-3-toluyl chloride*

A mixture of 180 grams (0.5 mole) of phosphorus pentachloride and 140 grams (0.67 mole) of cis-3,4,5,6,7,7 - hexachloro - 3,6-methano-1,2,3,6-tetrahydrophthalic acid was heated with stirring. A vigorous reaction began at 120–125° C. and the pot temperature rose to 150 degrees centigrade. The resulting solution was warmed at reflux for 8 hours and at the end of this time the phosphorus oxychloride and excess phosphorus pentachloride were stripped under vacuum. The residue, comprising cis-3,4,5,6,7,7-hexachloro-3,6-methano-1,2,3,6-tetrahydrophthaloyl chloride was heated with stirring to 208–220 degrees centigrade for 3.5 hours during which period 17 grams of hydrogen chloride was evolved. The main product weighing 133 grams (73%) distilled, B.P. 190–195/9.0 mm. Recrystallization of the product from hexane gave 75 grams of the rearrangement product 4,5,6,α,α,α-hexachloro-3-toluyl chloride, having a melting point of 105 degrees centigrade. Analysis.—Calcd. for $C_8HCl_7O$: Cl, 68.7. Found: Cl, 68.70.

*Example 4.—The preparation of the methyl ester of 4,5,6,α,α,α-hexachloro-3-toluic acid*

Five grams of 4,5,6,α,α,α-hexachloro-3-toluyl chloride were refluxed with 10 cc. of methanol until all of the benzoyl chloride went into solution. Upon cooling, a white, crystalline solid separated (needles) having a melting point of 94 degrees to 95 degrees centigrade. Chlorine analysis calculated for $C_9H_4Cl_6O_2$: Theory 59.7%. Found: 59.6%.

*Example 5.—The preparation of dyestuff from the product of Example 4*

A mixture of equal weights of the ester of Example 4, resorcinol and zinc chloride was heated to 140 degrees to 150 degrees centigrade. The mixture melted and developed a dark red color. After several minutes the reaction mixture was poured into water. A bright brick red solid was obtained which when dissolved in a solution of water and methanol was useful as a dye, for example, to dye wool pink. Also, when the solid was dissolved in a basic solution, it yielded a strong green fluorescent color.

*Example 6.—The preparation of the anilide of 4,5,6, α,α,α-hexachloro-3-toluic acid*

Two to three grams of 4,5,6,α,α,α-hexachloro-3-toluyl chloride dissolved in benzene was added to 1 cc. of aniline. A solid separated after an immediate exothermic reaction. After washing with dilute acid, the isolated solid was recrystallized from methanol and was found to have a melting point of 211 degrees to 212 degrees centigrade. Chlorine anal. for $C_{14}H_7Cl_6ON$: Theory 51.0%. Found: 51.4%.

*Example 7.—The preparation of the butyl ester of 4,5,6,α,α,α-hexachloro-3-toluic acid*

Three grams of 4,5,6,α,α,α-hexachloro-3-toluyl chloride was warmed with 20 cc. butyl alcohol until solution resulted. The solution was cooled to −20 degrees centigrade and white crystals resulted. The solid was recrystallized from butyl alcohol at a low temperature and was found to have a melting point of 48.8 degrees to 49.5 degrees centigrade. Chlorine anal. for $C_{12}H_{10}Cl_6O_2$: Theory 53.4%. Found: 53.3%.

*Example 8.—The preparation of a dyestuff from the product of Example 1*

Three and eight tenths grams of 4,5,6,α,α,α-hexachloro-3-toluyl chloride, 2.4 grams of dimethyl aniline and 1.3 grams of zinc chloride were heated, with stirring to 150 degrees centigrade. A reaction occurred which was exothermic. After several minutes the reaction product was poured into water. A red-brown solid resulted, which develops a blue color in solvents. When dissolved in a methanol-water solution, it dyes wool a light blue shade.

*Example 9.—Preparation of 4,5,6,α,α,α-hexachloro-3-toluic acid*

Thirty grams of 4,5,6,α,α,α-hexachloro-3-toluyl chloride and 225 grams of formic acid were stirred and heated to 90–100 degres centigrade for six hours. The final suspension resulting was poured into water. The white solid recrystallized from carbon tetrachloride to yield 19.2 grams, crystals M.P. 190–194 degrees centigrade, with decomposition. Analysis.—Calc'd. for $C_8Cl_6O_2H_2$: Cl, 62.2; Neutral equiv. 343. Found: Cl, 62.5; Neutral equiv. 342.

Plots infested with a variety of weed species were sprayed with an aqueous dispersion of 4,5,6,α,α,α-hexachloro-3-toluyl chloride at the rate of 16 pounds per acre prior to the emergence of the weeds, and 8 pounds per acre after the emergence of the weeds. (Separate plots.) The results observed about three weeks after spraying are given in the following table:

| Weed Species | Pre-Emergence Activity | Post-Emergence Activity |
| --- | --- | --- |
| Foxtail | 3 | 2 |
| Dock | 3 | 2 |
| Pigweed | 4 | 2 |
| Lambs Quarters | 2 | 3 |
| Chickweed | 4 | 2 |

0=no effect; 1=slight injury; 2=moderate injury; 3=severe injury; 4=complete kill.

An untreated control plot contained a vigorous stand of all the above named weed species.

The acid, lower alkyl esters and anilide compounds of this invention are also herbicidally active.

Although this invention has been illustrated by citing specific details of given species embraced within the scope of the invention, it is to be understood that various modifications within the invention are possible, some of which have been referred to above; therefore, I do not wish to be limited except as defined by the appended claim.

I claim:

The method for control of weeds which comprises applying to the locus to be protected in an amount sufficient to exert a herbicidal effect, a compound selected from the group consisting of 4,5,6,α,α,α-hexachloro-3-toluic acid, and the acid chloride, lower alkyl esters and anilide thereof.

References Cited by the Examiner

UNITED STATES PATENTS 3,013,055   12/61   Richter _____ 71—2.6 X
3,014,063   12/61   McLane et al. _____ 71—2.6 X
3,014,965   12/61   Newcomer et al. _____ 71—2.6 X

OTHER REFERENCES

Thompson et al.: Botanical Gazette, vol. 107, pages 475 to 507 (pages 489, 493 and 495 particularly relied upon), 1945.

Wain et al.: The Chemistry and Mode of Action of Plants Growth Substances, Butterworths Scientific Publications, page 120, London, 1956.

Weintraub et al.: Botanical Gazette, vol. 113, pages 348 to 362 (page 355 particularly relied upon), 1952.

JULIAN S. LEVITT, *Primary Examiner.*

LEWIS GOTTS, *Examiner.*